US005645311A

United States Patent [19]
Emmer et al.

[11] Patent Number: 5,645,311
[45] Date of Patent: Jul. 8, 1997

[54] SUN AND WIND SCREEN ARRANGEMENT FOR OPEN MOTOR VEHICLES

[75] Inventors: Ludwig Emmer, Grafenau; Michael Koch, Sindelfingen; Ferdinand Greiner, Wildberg, all of Germany

[73] Assignee: Mercedes-Benz AG, Stuttgart, Germany

[21] Appl. No.: 645,007

[22] Filed: May 9, 1996

[30] Foreign Application Priority Data

May 9, 1995 [DE] Germany .............. 195 16 921.2

[51] Int. Cl.$^6$ ................................................ B60J 7/22
[52] U.S. Cl. ............... 296/180.5; 297/184.17; 296/97.1
[58] Field of Search ............... 296/97.1, 180.1, 296/180.5, 85; 297/184.1, 184.11, 184.12, 184.13, 184.15, 184.17

[56] References Cited

U.S. PATENT DOCUMENTS

| | | | |
|---|---|---|---|
| 2,530,266 | 11/1950 | Quackenbush | 296/85 |
| 2,658,793 | 11/1953 | Sinclair | 296/85 |
| 3,151,662 | 10/1964 | Fait. | |
| 3,246,923 | 4/1966 | Turner | 296/180.1 |
| 3,339,566 | 9/1967 | Bowden | 297/184.11 |
| 5,333,665 | 8/1994 | Safar. | |
| 5,443,296 | 8/1995 | Just et al. | 296/180.5 X |

FOREIGN PATENT DOCUMENTS

| | | |
|---|---|---|
| 615 738 | 1/1927 | France. |
| 657 568 | 2/1938 | Germany. |
| 3235148C2 | 3/1984 | Germany. |
| 4401048A1 | 4/1995 | Germany. |
| 2225992 | 6/1990 | United Kingdom. |

OTHER PUBLICATIONS

Patent Abstracts of Japan, vol. 14, No. 140 (M–0950), Mar. 16, 1990; JP 02 006243 (Mazda Motor Ltd.), Jan. 10, 1990.

Patent Abstracts of Japan, vol. 16, No. 399 (M–1300), Apr. 24, 1992; JP 04 133828 (Mazda Motor Corp.), May 7, 1992.

Search Report Jul 1, 1996 United Kingdom.

*Primary Examiner*—Joseph D. Pape
*Attorney, Agent, or Firm*—Evenson McKeown Edwards & Lenahan, PLLC

[57] ABSTRACT

Swivellable screens are known for the protection of rear passengers in passenger cars equipped with folding sliding tops which, however, protect only the rear passengers but not the driver or the front seat passenger of a convertible from the effects of the wind and the sun. It is suggested to arrange the screen such on a headrest assigned to the vehicle seat that it can be swivelled in the driving direction toward the front beyond the top edge of the headrest into an approximately horizontal position above the head of an occupant. As a result of this design, the screen, in a very simple manner, takes over the sun protection, for example, for the driver of a convertible even if this driver does not wear any headgear.

3 Claims, 2 Drawing Sheets

SUN AND WIND SCREEN ARRANGEMENT FOR OPEN MOTOR VEHICLES

BACKGROUND AND SUMMARY OF THE INVENTION

This invention relates to a sun and wind partition for open motor vehicles, particularly convertibles, comprising a screen swivellably mounted in an area above an occupants' head on parts fixed to the vehicle.

Such a wind and sun partition is known from German Patent Document DE-PS 657 568. There, a pane which can be swivelled about an axis was mounted in the area of the rear passengers on guide rods laterally mounted on the roof frame, which pane, during a drive with an open sliding roof, is to protect the rear passengers from unpleasant airstream influences and from sun radiation.

From German Patent Document DE-OS 32 35 148, it is also known to assign wind deflectors in the case of vehicles with a convertible top to the padded roof cross member arrangement extending transversely above the windshield to a rollover bar provided in the center of the vehicle or to the headrests of the vehicle seats in such a manner that, from an inoperative position in which they are adapted approximately to the contour of these supporting parts, the wind deflectors can be folded up into the operative position. In this case, the wind deflectors are such that, when they are provided on the headrests, they can be adjusted approximately vertically upward or, when they are provided on the rollover bar or on the roof cross member, they can be adjusted slightly toward the rear against the driving direction so that they can exercise their wind deflection function. Such wind partitions arranged on the roof cross member provided above the windshield, in their operative position, may also cause a certain sun deflection for the driver and the front seat passenger if the sun radiation takes place from the front. However, such constructions are not suitable for preventing, in the case of a convertible, a sun radiation onto the driver's or front seat passenger's head or also the heads of rear occupants if the sun radiation takes place essentially vertically from above or even from the rear.

It is an object of the invention to provide a sun protection for the occupants of convertibles which is effective irrespectively of the type of sun radiation and which makes it possible for the vehicle occupants to drive without wearing any headgear.

For achieving this object, it is provided in the case of a sun and wind partition of the initially mentioned type that the screen is arranged such on a headrest assigned to the vehicle seat that it can be swivelled in the driving direction toward the front beyond the upper edge of the headrest into an approximately horizontal position above the occupant's head. By means of this development, a sun screen can be folded over the occupant's head in the manner of a protective roof. In this case, it can protect against sun radiation as well as against wind, particularly if it is provided with a correspondingly curved contour or is slightly inclined toward the front.

As a further development of the invention, the upper edge of the headrest can be moved upward so that it projects beyond the occupant's head. The screen may then in a simple manner be pivotally connected in the upper area of the headrest and, since the vertical adjustment takes place by means of the headrest, no special mechanism must be provided in order to move the screen high enough when it is in the operative position.

In a further development of the invention, the screen may be mounted on a swivel hinge arranged on both sides in the rear area of the headrest, detent devices for holding the screen in two end positions being assigned to this swivel hinge, in which case one end position is the operating position in the horizontal position above the occupant's head and the other end position is an inoperative position extending in parallel to the back side of the seat.

As a further development of the invention, the screen may project beyond the headrest with lateral projections for shading the shoulder area. The screen may finally consist of a transparent but tinted material which keeps away harmful sun radiation.

Other objects, advantages and novel features of the present invention will become apparent from the following detailed description of the invention when considered in conjunction with the accompanying drawings.

DETAILED DESCRIPTION OF THE DRAWINGS

Figure 1:
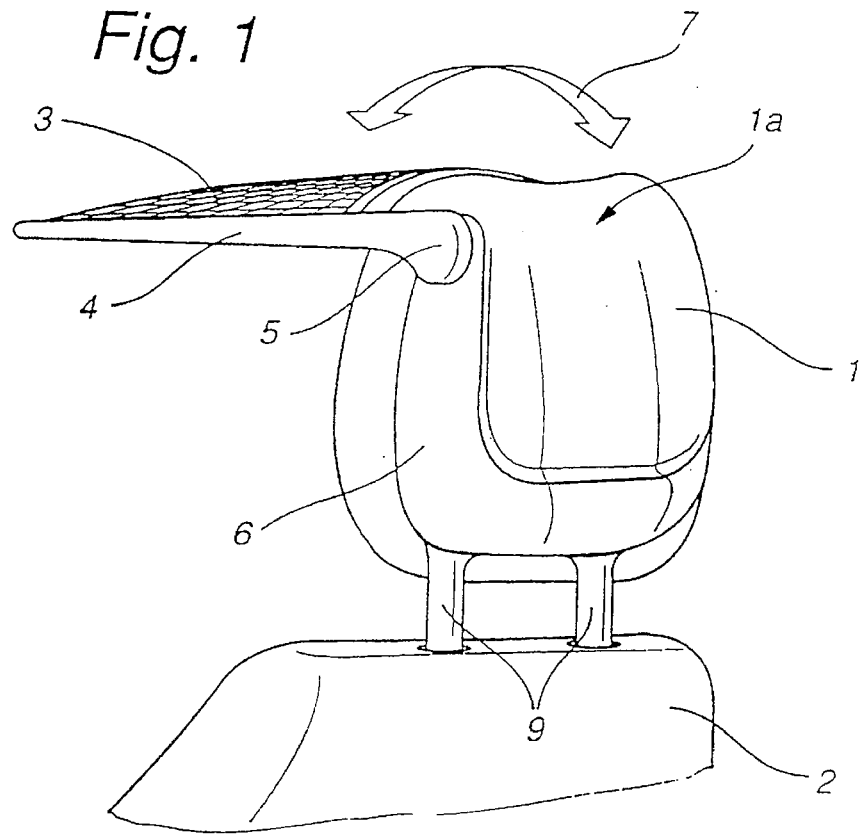
FIG. 1 is a perspective view of a sun and wind partition on a headrest of a driver's seat in an operative position constructed according to a first preferred embodiment of the present invention.
Figure 2:
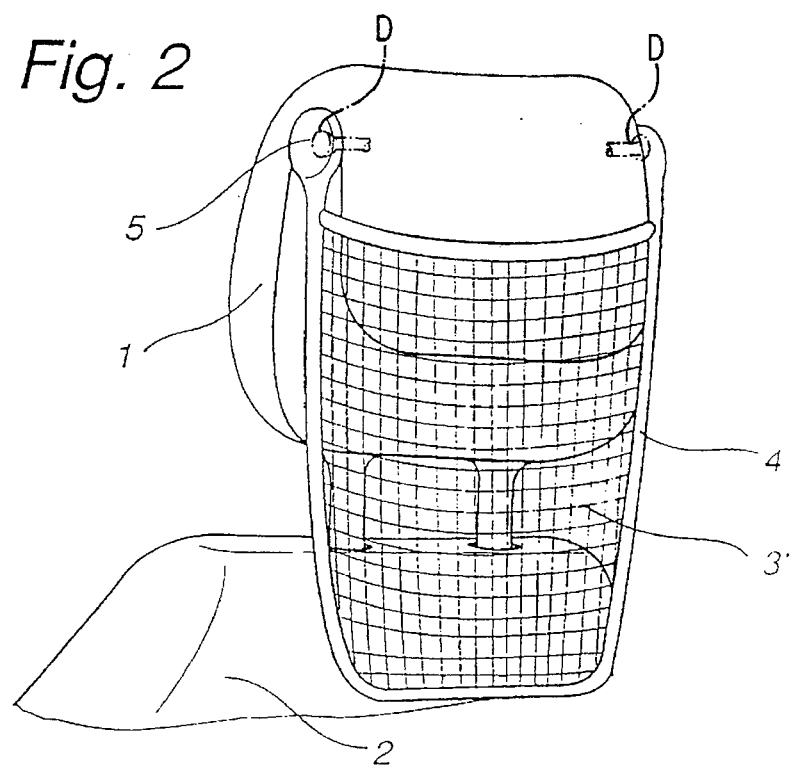
FIG. 2 is a perspective view of the wind partition of FIG. 1, shown in a folded-away inoperative position.

It is illustrated in FIG. 1 and 2 that a screen 3 is arranged on a headrest 1 of a driver's seat 2 and is held on a bow 4 which, in turn, is arranged so that it can be swivelled around a hinge 5 which is mounted on both sides of the headrest 1 on a bow 6 framing the headrest 1 on the rear in a U-shape. These hinges 5 are constructed such that the screen 3 can be folded away from the position illustrated in FIG. 1 in the direction of the arrow 7 and clockwise toward the rear until it reaches its inoperative position 3' illustrated in FIG. 2. In addition, the hinge is constructed such that the screen 3 is held in its two end positions, that is, in the operative position illustrated in FIG. 1, in which it projects approximately horizontally from the upper edge 1a of the headrest 1 against the driving direction toward the front, and in its inoperative position 3' according to FIG. 2 in which it extends approximately in parallel to the rear side of the seat 2 and to the rear side of the headrest 1. This may be ensured by means of known detent devices D (schematically shown in FIG. 2). In preferred embodiments these detent devices are spring loaded detent members carried for axial movement along the pivot axis of the hinges 5 for engagement in locking indentations at the respective end positions of the screen 3. The spring and detent/indentations are configured to accommodate manual pivoted movement of the screen between the end positions.

Figure 3:
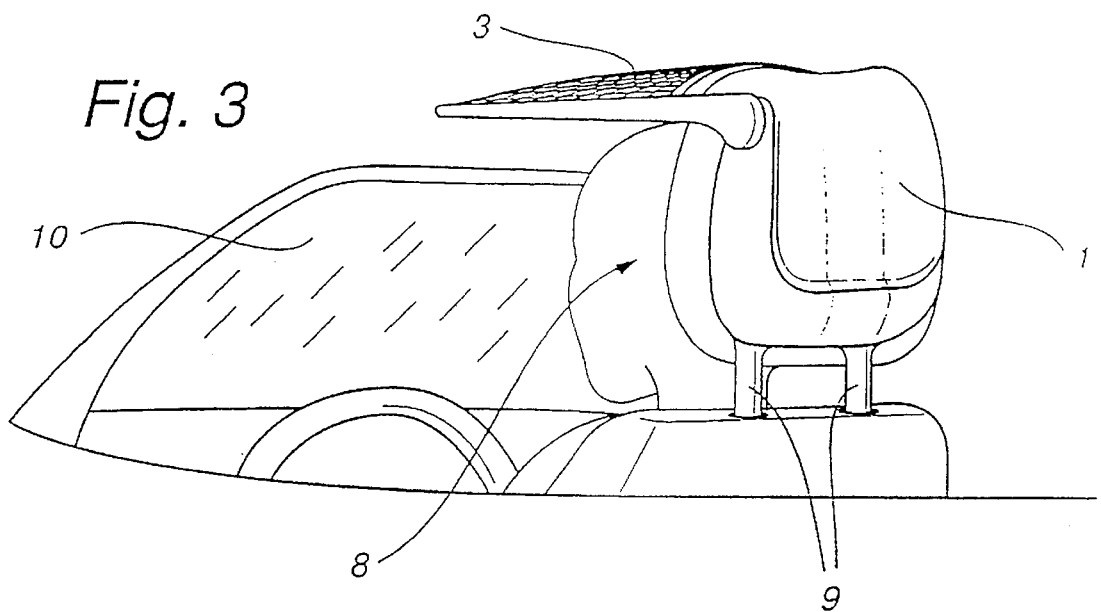
FIG. 3 is a schematic representation of the wind and sun partition of FIG. 1, shown with the assigned driver and adjacent vehicle structure.

FIG. 3 illustrates the meaning and purpose of the arrangement of this swivellable screen. It is shown here that the driver's head 8 is situated below the screen 3 in the operative position. For this purpose, the headrest 1, which is vertically adjustable on adjusting rods 9, is moved out so far in the upward direction that the screen 3 is situated above the driver's head 8. As also outlined in FIG. 3, the screen 3 has a contour which is curved upwards in a roof-type manner and which is approximately adapted to the area which would occur in the case of a smooth flow around the vehicle from the direction of the windshield 10 if no flow separations were to take place. As can easily be recognized, as a result of this design, the screen 3 also takes over the function of a wind deflector which can provide an irrotational flow around the open vehicle. This has the result that the drag coefficient can be kept low when the screen is in its operative position.

As schematically shown in FIG. 2, the screen 3 has a transparent design and consists of a material, particularly a plastic material, which is otherwise also used for sun screens. The transparent material of the screen 3 is tinted. The screen 3 can therefore protect the driver's head 8 also from a harmful sun radiation which particularly is also bothersome when the vehicle is in a traffic jam, for example. The screen 3 makes it possible for the driver and analogously naturally also for the front seat passenger or the rear seat passenger to drive without wearing any headgear. The illustrated screen 3 has a reinforcing grid pattern of wire or plastic mesh embedded in the plastic. However, embodiments are contemplated with tinted transparent plastic material, without any reinforcing mesh.

Figure 4:
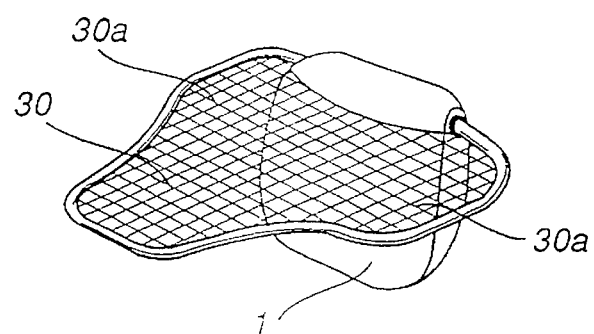
FIG. 4 is a perspective representation of a variant of the wind and sun protection according to the invention which is in its operative position and is mounted on a headrest.
Figure 5:
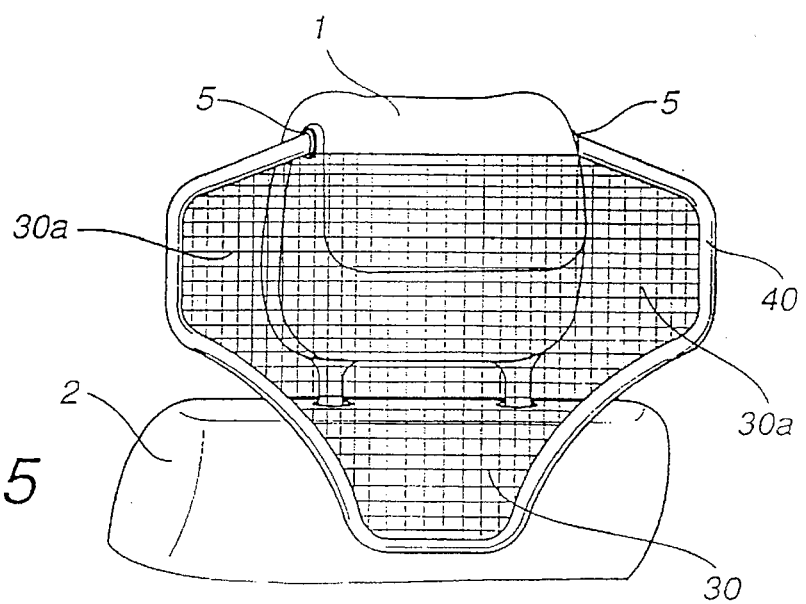
FIG. 5 is a view of the wind and sun partition of FIG. 4 but in the folded-away inoperative position.

FIGS. 4 and 5 show a variant of a screen 30 which is swivellably arranged in the same manner in the area of the upper edge of a headrest 1. FIG. 4 shows that, in its operative position, that is, when it projects toward the front in the driving direction from the headrest 1 in an approximately horizontally aligned manner, the screen 30 is also provided with two areas 30a laterally projecting beyond the head rest which increase the shading surface and may also be used for shading the shoulder parts of the driver or the front seat passenger or other occupants. The bow 40 which frames the screen 30 is therefore bent out laterally in a corresponding manner. However, it is also fastened to the headrest 1 by way of hinges which ensure the securing of the two end positions according to FIG. 4 (operative position) and according to FIG. 5 (inoperative position). According to FIG. 5, the screen 30 is folded away to the rear side of the headrest 1. Like the screen 3 of FIGS. 1 and 2, it was folded over from its operative position according to FIG. 4 clockwise toward the rear by an angle of approximately 270° so that, in its inoperative position according to FIG. 5, it rests with its surface in parallel on the rear side of the headrest 1 and of the upper seat area 2. The screen 30 may be produced from the same materials as described for the screen 3 of FIGS. 1–3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Sun and wind screen arrangement for open motor vehicles, consisting of a screen which is swivellably mounted in an area above a head of occupants on parts fixed to the vehicle, wherein the screen is arranged in such a manner in an upper area on a headrest assigned to a vehicle seat that it can be swivelled in a driving direction toward a vehicle front beyond an upper edge of the headrest into an approximately horizontal position above an occupant's head, wherein the upper edge of the headrest can be selectively moved upwards so far that it projects beyond the occupant's head, wherein the screen is mounted on a hinge arranged on both sides on the headrest, and wherein detent devices for holding the screen in two end positions are assigned to the hinge, one end position being the operative position in the horizontal position above the occupant's head and the other end position being an inoperative position extending in parallel to the rear side of the seat.

2. Sun and wind arrangement according to claim 1, wherein the screen has lateral areas which laterally project beyond the area of the headrest to protect an occupant's shoulder area.

3. Sun and wind screen arrangement according to claim 1, wherein the screen consists of a transparent but tinted material suitable for absorbing the sun radiation.

* * * * *